(12) United States Patent
Takahashi

(10) Patent No.: US 10,678,934 B2
(45) Date of Patent: Jun. 9, 2020

(54) ACCESS INFORMATION SETTING SYSTEM, ACCESS INFORMATION SETTING METHOD AND DATA TRANSMISSION DEVICE

(71) Applicant: Konica Minolta, Inc., Tokyo (JP)

(72) Inventor: Masao Takahashi, Chofu (JP)

(73) Assignee: Konica Minolta, Inc., Tokyo (JP)

( * ) Notice: Subject to any disclaimer, the term of this patent is extended or adjusted under 35 U.S.C. 154(b) by 217 days.

(21) Appl. No.: 15/871,590

(22) Filed: Jan. 15, 2018

(65) Prior Publication Data

US 2018/0211053 A1 Jul. 26, 2018

(30) Foreign Application Priority Data

Jan. 20, 2017 (JP) .................................. 2017-008980

(51) Int. Cl.
| | | |
|---|---|---|
| *G06F 21/60* | (2013.01) | |
| *G06F 21/34* | (2013.01) | |
| *H04L 29/06* | (2006.01) | |

(52) U.S. Cl.
CPC ............ *G06F 21/608* (2013.01); *G06F 21/34* (2013.01); *G06F 21/604* (2013.01); *H04L 63/0853* (2013.01); *H04L 63/08* (2013.01); *H04L 63/10* (2013.01)

(58) Field of Classification Search
CPC ...... G06F 21/608; G06F 21/604; G06F 21/34; H04L 63/10; H04L 63/08; H04L 63/0853
See application file for complete search history.

(56) References Cited

U.S. PATENT DOCUMENTS

| | | | | |
|---|---|---|---|---|
| 7,991,900 B2* | 8/2011 | Kubota | ................. | H04W 76/10 709/228 |
| 8,429,259 B2* | 4/2013 | Suzuki | .................... | H04L 41/08 709/223 |
| 9,800,587 B2* | 10/2017 | Takamiya | ............. | H04L 63/105 |
| 2002/0110123 A1* | 8/2002 | Shitama | .................. | H04L 63/08 370/389 |
| 2005/0180793 A1* | 8/2005 | Nishiguchi | ............ | G06K 15/00 400/76 |
| 2006/0002352 A1* | 1/2006 | Nakamura | .......... | H04L 41/0816 370/338 |
| 2006/0288116 A1* | 12/2006 | Seki | ...................... | H04L 63/102 709/232 |

(Continued)

FOREIGN PATENT DOCUMENTS

| | | |
|---|---|---|
| JP | 2006-19915 A | 1/2006 |
| JP | 2006-333428 A | 12/2006 |

(Continued)

*Primary Examiner* — Matthew Smithers
(74) *Attorney, Agent, or Firm* — Osha Liang LLP

(57) ABSTRACT

An access information setting system includes: a data reception device; a data transmission device that transmits data to the data reception device via a network; and a writing device that writes access information for accessing to the data reception device via the network, in a storing medium. The data transmission device obtains the access information written in the storing medium, and sets a network setting for accessing to the data reception device in accordance with the access information as one network setting which can be used by the data transmission device.

18 Claims, 10 Drawing Sheets

(56) References Cited

U.S. PATENT DOCUMENTS

| | | | | |
|---|---|---|---|---|
| 2007/0201489 A1* | 8/2007 | Igarashi | ............... | H04L 12/4675 |
| | | | | 370/395.53 |
| 2007/0220269 A1* | 9/2007 | Suzuki | ................. | H04N 1/0097 |
| | | | | 713/182 |
| 2009/0073493 A1* | 3/2009 | Kuramochi | ........... | G06F 21/608 |
| | | | | 358/1.16 |
| 2010/0031350 A1* | 2/2010 | Ueda | ....................... | G06F 21/34 |
| | | | | 726/20 |
| 2010/0071047 A1* | 3/2010 | Kawano | ................. | G06F 21/34 |
| | | | | 726/9 |
| 2011/0107402 A1* | 5/2011 | Nagata | ................ | G06F 16/9038 |
| | | | | 726/4 |
| 2013/0167217 A1* | 6/2013 | Inomata | .................. | G06F 21/41 |
| | | | | 726/8 |
| 2014/0325595 A1* | 10/2014 | Shinosaki | ............ | G06F 21/31 |
| | | | | 726/2 |
| 2016/0357976 A1* | 12/2016 | Suzuki | .................... | G06F 21/31 |

FOREIGN PATENT DOCUMENTS

| | | |
|---|---|---|
| JP | 2010-181876 A | 8/2010 |
| JP | 2016-15080 A | 1/2016 |

* cited by examiner

ACCESS INFORMATION SETTING SYSTEM, ACCESS INFORMATION SETTING METHOD AND DATA TRANSMISSION DEVICE

CROSS-REFERENCE TO RELATED APPLICATIONS

The entire disclosure of Japanese Patent Application No. 2017-8980 filed on Jan. 20, 2017, is incorporated herein by reference in its entirety.

BACKGROUND

Technical Field

The present invention relates to an access information setting system and an access information setting method for setting the network setting in a data transmission device so as to communicate with a data reception device, and a data transmission device.

Description of the Related Art

Conventionally, in an image forming apparatus having the scan function, such as an MFP (Multi Function Peripheral) or the like, in general, the scan data is transmitted to an external device by the function, such as the Scan To SMB (for transmitting the scan data to the shared folder by using Samba) or the like.

In this case, every when the network configuration including a PC (Personal Computer), a server and the like, which are the transmission destination of the scan data is changed, every when the IP (Internet Protocol) address of the transmission destination of the scan data is changed, or every when the domain or the authentication method, such as the password or the like, is changed, the transmission destination information for the PC and the server, which is registered in the MFP must be reset.

Therefore, in the above case, the technology for resetting the transmission destination information by a simple method, has been proposed.

For example, in Japanese Patent Application Publication No. 2016-15080, the following technology is disclosed. In this technology, the communication terminal device (the print apparatus) previously inquires about the MAC (Media Access Control) address of the device which is provided on the network and the IP address thereof by the broadcasting to record the MAC address and the IP address. Then, the communication terminal device reads the MAC address recorded in the IC card which is held on a card reader by a user, and in case that the IP address corresponding to the read MAC address is recorded, the communication terminal device carries out the communication with the device having the IP address corresponding to the read MAC address.

In case that the subnetwork which the device belongs to as the transmission destination of the scan data is different from the subnetwork which the MFP belongs to, when the communication between the device and the MFP cannot be carried out by the broadcasting or when the filter is added between the above subnetworks, there is some possibility that the trouble is caused, for example, the MFP cannot access to the PC even though the IP address or the like is set as the transmission destination.

In the method disclosed in Japanese Patent Application Publication No. 2016-15080, even though the IP address of the device which communicates with the print apparatus is changed, the system can follow the change in the IP address. However, it is not possible to obtain the MAC address of the device which belongs to the network which the data transmitted by the broadcasting does not reach. As a result, the above disclosed method cannot be applied. Further, it is not possible to set the network setting, such as the authentication method, the net mask or the like, which is matched with the network which the device communicating with the print apparatus belongs to. As a result, there is some possibility that the communication cannot be normally carried out even though the IP address is obtained.

SUMMARY

One or more embodiments of the present invention provide an access information setting system, an access information setting method and a data transmission device which can simply and certainly set the network setting for accessing to the data reception device, in the data transmission device even though the IP address of the data reception device is changed, the network configuration of the network which the data reception device belongs to is changed, or the account for enabling the data transmission device to access to the data reception device is changed.

According to one or more embodiments of the present invention, an access information setting system comprises:
a data reception device;
a data transmission device that transmits data to the data reception device via a network; and
a writing device that writes access information for accessing to the data reception device via the network, in a storing medium,
wherein the data transmission device obtains the access information written in the storing medium, and sets a network setting for accessing to the data reception device in accordance with the access information as one network setting which can be used by the data transmission device.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF THE EMBODIMENTS

Hereinafter, embodiments of the present invention will be described with reference to the drawings. However, the scope of the invention is not limited to the disclosed embodiments.

Figure 1:
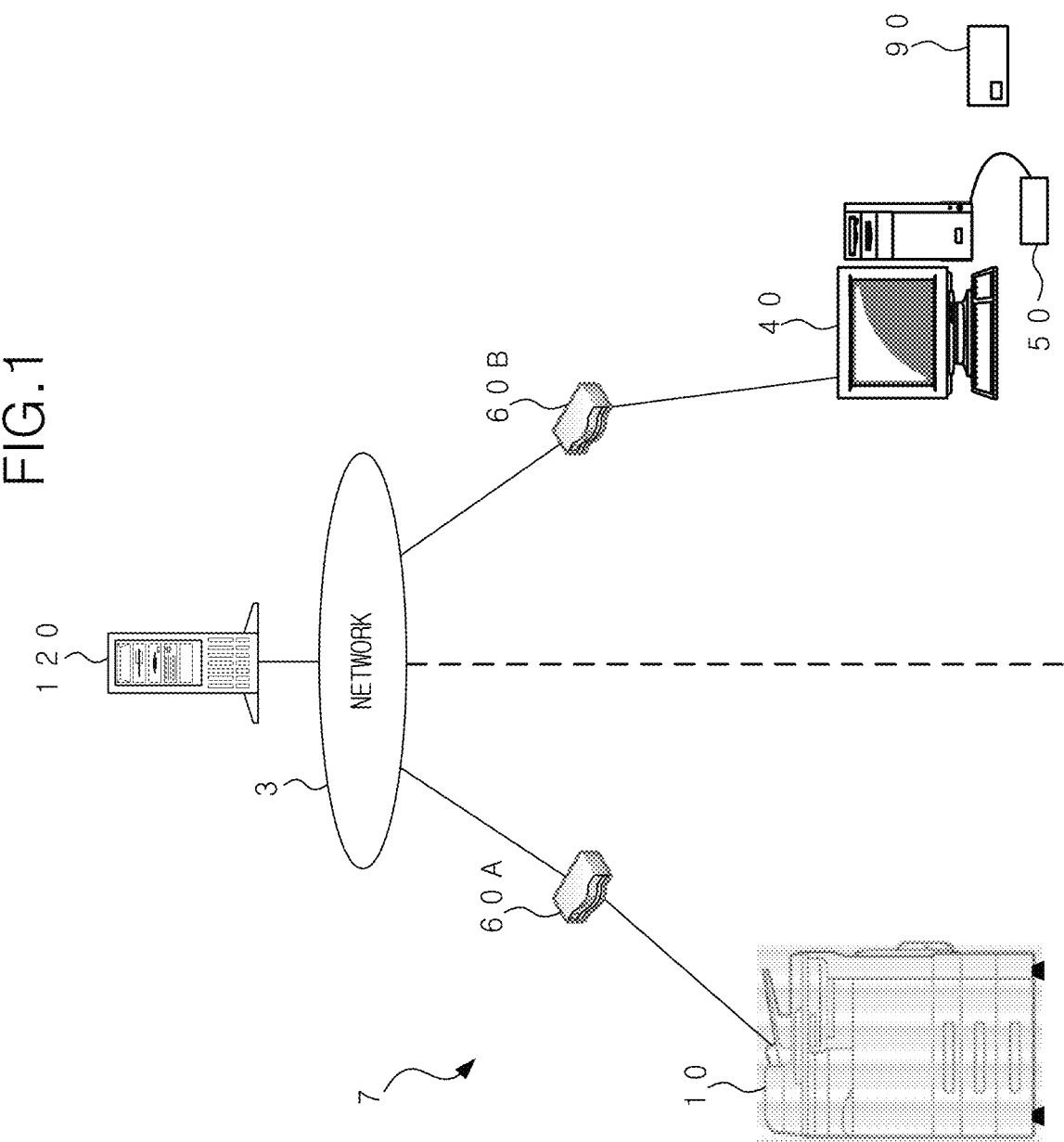
FIG. 1 is a view showing the access information setting system according to one or more embodiments of the present invention.

FIG. 1 shows the access information setting system 7 including the image forming apparatus 10 having the function as the data transmission device according to one or more embodiments of the present invention. In the access information setting system 7, the image forming apparatus 10 and the PC terminal 40 are connected so as to be communicable with each other via the network 3 by using the routers 60A and 60B which are different from each other.

In the access information setting system 7, the image forming apparatus 10 is connected with the network 3 via the router 60A, and the PC terminal 40 is connected with the network 3 via the router 60B. That is, the image forming apparatus 10 and the PC terminal 40 belong to the different subnetworks. The image forming apparatus 10 cannot directly access to the router 60B. Similarly, the PC terminal 40 cannot directly access to the router 60A.

The image forming apparatus 10 is a so-called multi function peripheral which has the function for executing various types of jobs, such as a copy job for printing out an image of an original on a recording sheet by optically reading the original, a scan job for storing the image data of the read original as a file and/or for transmitting the image data to an external device, a print job for printing out an image on the recording sheet in accordance with the image data received from an external device or the like, and the like. In one or more embodiments of the present invention, the image forming apparatus 10 transmits the image data obtained by executing the scan job to the PC terminal 40.

The PC terminal comprises a display unit, an operating unit, and the like, and can view and edit the document file, the image file and the like. In one or more embodiments of the present invention, the PC terminal 40 comprises the card access device 50 and writes the access information which is used when another external device accesses to the PC terminal 40, in the IC card 90 which is mounted on the card access device 50. The access information will be explained below.

In one or more embodiments of the present invention, the image forming apparatus 10 reads out the access information from the IC card 90 of a user, in which the access information has been written. Then, in accordance with the access information, the network setting for accessing to the PC terminal 40 is set in the image forming apparatus 10 as one network setting which can be used by the image forming apparatus 10. Therefore, it is possible to easily set the network setting for accessing to the PC terminal 40.

Further, in one or more embodiments of the present invention, a user logs in the PC terminal 40 and the image forming apparatus 10 by using the IP card 90. When the user successfully logs in the PC terminal 40, the access information is written in the IC card 90 from the PC terminal 40. Further, when the user successfully logs in the image forming apparatus 10 by the IC card 90, the access information written in the IC card 90 is read by the image forming apparatus 10.

Further, in the access information setting system 7, other devices, such as the lending server 120 which will be explained below, the authentication server which is omitted from the drawings, and the like may be included.

Next, the configuration of the image forming apparatus 10 according to one or more embodiments of the present invention is explained.

Figure 2:
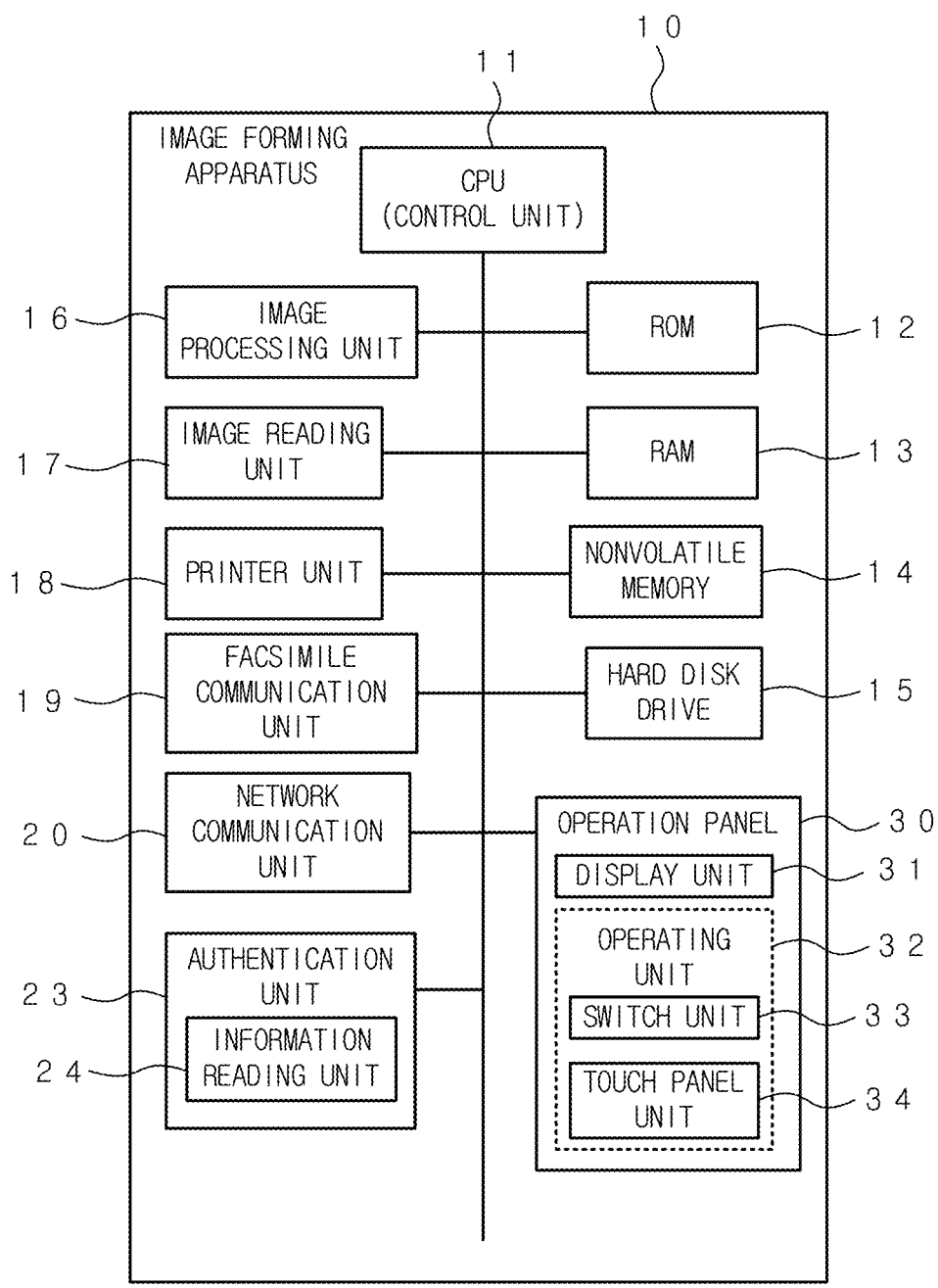
FIG. 2 is a block diagram showing the schematic configuration of the image forming apparatus according to one or more embodiments of the present invention.

FIG. 2 shows a block diagram showing the schematic configuration of the image forming apparatus 10 according to one or more embodiments of the present invention. The image forming apparatus 10 comprises a CPU (Central Processing Unit) 11 for entirely controlling the operation of the image forming apparatus 10. The CPU 11 including a microprocessor is connected with a ROM (Read Only Memory) 12, a RAM (Random Access Memory) 13, a nonvolatile memory 14, a hard disk drive 15, an image processing unit 16, an image reading unit 17, a printer unit 18, a facsimile communication unit 19, a network communication unit 20, an authentication unit 23 and an operation unit 30 via a bus.

By the CPU 11, a middleware, application programs and the like are executed on an OS (Operating System) program as a base. Further, the CPU 11 has the function as the control unit for controlling the display contents of the operation panel 30.

In the ROM 12, various types of programs are stored. By executing various types of processes by the CPU 11 in accordance with these programs, each function of the image forming apparatus 10 is realized. Further, in the ROM 12, the program which is executed by the CPU 11 to control the image forming apparatus 10 is stored.

The RAM 13 is used as a work memory for temporarily storing various data when the CPU 11 executes the process in accordance with the programs, and as an image memory for storing the image data, and the like.

The nonvolatile memory 14 is a memory (flash memory) in which the stored contents are not damaged even if the image forming apparatus 10 is turned off, and is used for storing various types of settings. The hard disk drive 15 is a large-capacity nonvolatile memory device. In the hard disk drive 15, the OS program, various types of application programs, the print data, the image data, the history of the information relating to the job, and the like are stored.

The image processing unit 16 carries out the rasterizing process for converting print data into image data, the compression/decompression process for the image data, and the like in addition to the processings, such as the enlargement/reduction or the rotation of image data. The image processing unit 16 has the function as the reduction unit.

The image reading unit 17 has the function for obtaining image data by optically reading an image of an original. For example, the image reading unit 17 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors, and the like for guiding the reflected light from the original to the line image sensor and focusing the reflected light on the line image sensor, a converting unit for converting an analog image signal outputted from the line image sensor into digital image data, and the like.

The printer unit 18 has the function for forming an image on the recording sheet in accordance with the image data. In one or more embodiments of the present invention, the printer unit 18 is configured as a so-called laser printer which comprises a conveying device for the recording sheet, a photoconductive drum, a charging device, a laser unit, a developing device, a transfer and separation device, a cleaning device and the fixing device, and which forms an image by the electrophotographic process. Alternatively, an image may be formed by another type of printer.

The facsimile communication unit 19 has the function for transmitting and receiving the image data to/from an external device having the facsimile function via a telephone line.

The network communication unit 20 has the function for communicating with the PC terminal 40, other external devices and the like via the network, such as LAN (Local Area Network) or the like.

The authentication unit 23 carries out the user authentication for a user who uses the image forming apparatus 10. In one or more embodiments of the present invention, the information reading unit 24 is provided as an external device of the image forming apparatus 10, for example, at the edge portion of the operation panel 30 or the like. When the IC card 90 contacts with the information reading unit 24, the authentication unit 23 obtains the user information registered in the IC card 90 and identifies the log-in user. Then, in case that the identified log-in user is a user having the right for the use of the image forming apparatus 10, the authentication unit 23 allows the log-in user to use the image forming apparatus 10.

In one or more embodiments of the present invention, when the authentication unit 23 succeeds in the user authentication, the information reading unit 24 obtains the access information from the IC card 90.

The operation panel 30 comprises a display unit 31 and an operating unit 32. The operating unit 32 comprises a switch unit 33, such as a start button and the like, and a touch panel unit 34. The display unit 31 comprises a liquid crystal display and the like, and has the function for displaying various types of operation windows, setting windows and the like. In one or more embodiments of the present invention, the CPU 11 controls the display contents to be displayed by the operation panel 30, and the reception of the operation via the operation panel 30.

The touch panel unit 34 is provided on the display unit 31. The touch panel unit 34 detects the coordinate position on which a user touches the display unit 31 by using a touch pen, a user's finger or the like, a flick operation, a drag operation and the like.

Next, the card access device of the PC terminal 40 will be explained. The card access device 50 of the PC terminal 40 has the function for writing the above-described access information and the function as the authentication unit 23. Specifically, when the user logs in the PC terminal 40 and the IC card 90 contacts with the card access device 50, the PC terminal 40 identifies the log-in user by reading the user information from the IC card 90. The access information is written when the user successfully logs in the PC terminal 40 as described above.

Next, the operation of the access information setting system 7 will be explained by referring to FIG. 3. Firstly, the user logs in the PC terminal 40 by mounting the IC card 90 on the card access device 50. Then, the PC terminal 40 writes the access information in the IC card 90 (T1).

Next, the user carries the IC card 90 and moves to the image forming apparatus 10. Then, the user logs in the image forming apparatus 10 by contacting the IC card 90 with the information reading unit 24. When the user successfully logs in the image forming apparatus 10, the image forming apparatus 10 obtains the access information for accessing to the PC terminal 40, from the IC card 90 (T2).

Then, the image forming apparatus 10 sets the network setting for accessing to the PC terminal 40 in accordance with the obtained access information as one network setting which can be used by the image forming apparatus 10. In case that the user transmits the scan data or the like to the PC terminal 40 from the image forming apparatus 10, the image forming apparatus 10 transmits the data to the PC terminal 40 by using the set network setting (T3). In one or more embodiments of the present invention, when the user logs out from the image forming apparatus 10, the network setting which is set in accordance with the access information is deleted.

Next, the access information and the network setting will be explained. For example, the access information includes the setting information, such as the IP address of the PC terminal 40 and the like, the authentication method for accessing to the PC terminal 40, the transmission source address which is used for the transmission of the data, and the account information for enabling the image forming apparatus 10 to access to the PC terminal 40 or the address of the lending server 120 for temporarily lending the account for enabling the image forming apparatus 10 to access to the PC terminal 40, and the like.

Figure 3:
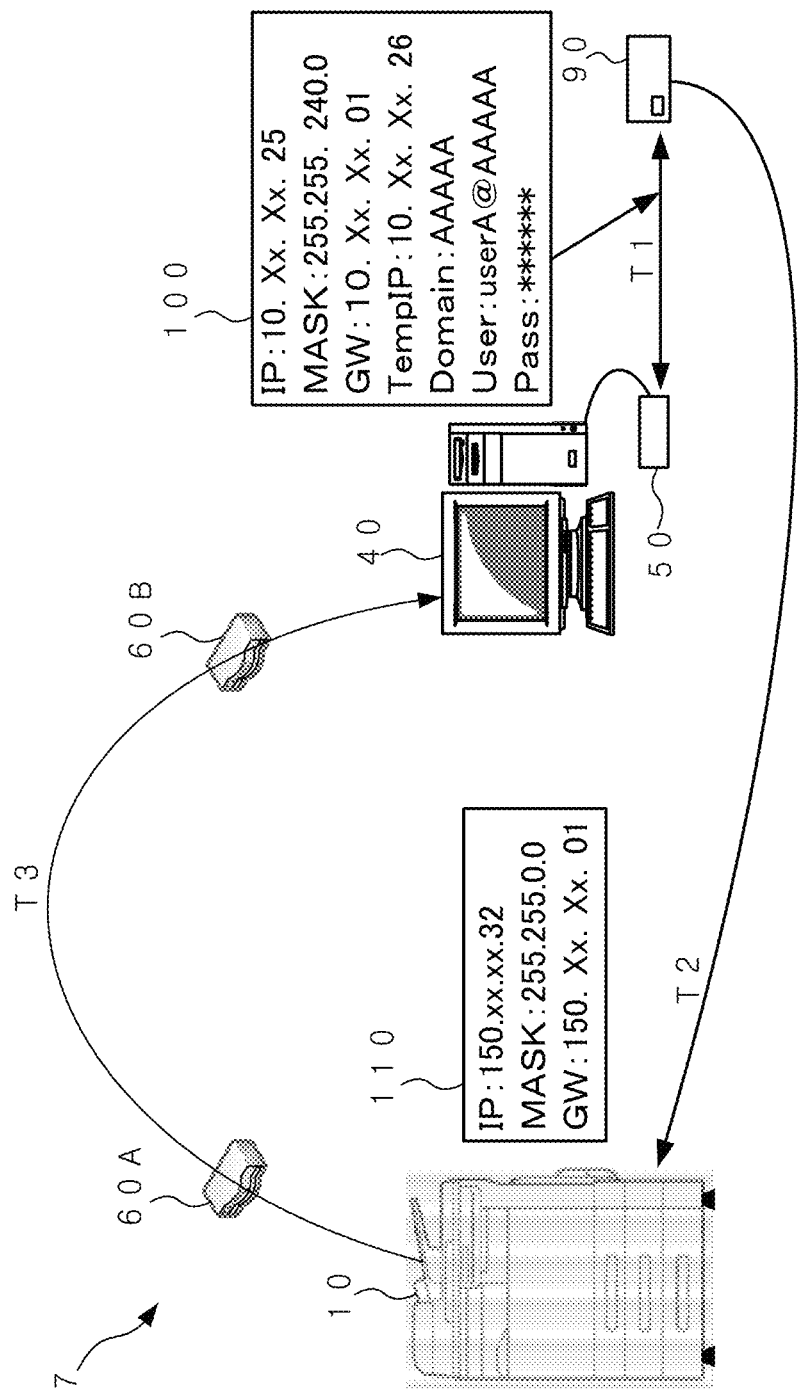
FIG. 3 is a view showing the operation of each device in the access information setting system according to one or more embodiments of the present invention.

In FIG. 3, the setting information 110 which is the setting information of the image forming apparatus 10 and the access information 100 which is written in the IC card 90 by the PC terminal 40, are shown.

In the setting information 110 shown in FIG. 3, the IP address (in the drawing, "150.xx.xx.32"), the MASK (in the drawing, "255.255.0.0") and the GW (Gate Way) (in the drawing, "150.Xx.Xx.01"), are included.

In the access information 100 shown in FIG. 3, the IP address (in the drawing, "10.Xx.Xx.25"), the MASK (in the drawing, "255.255.240.0"), the GW (in the drawing, "10.Xx.Xx.01"), the Temp IP (in the drawing, "10.Xx.Xx.26"), the domain (in the drawing, "AAAAA"), the account information (in the drawing, "userA@AAAAA") and the password (in the drawing, "******") are included.

In case that the image forming apparatus 10 sets the network setting for accessing to the PC terminal 40 in accordance with the access information 100, the IP address, the MASK, the GW and the like are set as the information of the access destination. The other information is used, for example, for the authentication for accessing to the PC terminal 40, and the like.

In one or more embodiments of the present invention, in the authentication method in which the account information and the password are used, the instruction for carrying out the authentication for accessing to the PC terminal 40 is included in the access information 100. The image forming apparatus 10 accepts the authentication for accessing to the PC terminal 40 by using the authentication method and the account information designated in the access information 100. Then, the image forming apparatus 10 transmits the data to the PC terminal 40 by using the network setting.

In case that, instead of the account information, the address of the lending server 120 is included in the access information 100, the image forming apparatus 10 borrows the account from the lending server 120 by using the address of the lending server 120. Then, the image forming apparatus 10 accepts the authentication for accessing to the PC terminal 40 by using the above authentication method and the account borrowed from the lending server 120, and the transmits the data to the PC terminal 40.

Further, for example, the authentication for accessing to the PC terminal 40 may be carried out by the PC terminal 40. Alternatively, the authentication server may be provided, and the above authentication may be carried out by the authentication server. In case that the authentication for accessing to the PC terminal 40 is carried out by the authentication server, the address for accessing to the authentication server and the instruction for carrying out the authentication in the authentication server, are included in the access information 100.

The network setting which is set in accordance with the access information 100 by the image forming apparatus 10, includes the transmission address. For example, in FIG. 3, the IP address "IP: 10.Xx.Xx.25" included in the access information 100 is set as the transmission destination address. Further, the Temp IP "10.Xx.Xx.26" is set as the transmission source address.

The transmission source address (Temp IP) included in the access information 100 is the address which is assigned in the subnetwork which the PC terminal 40 belongs to. In case that the image forming apparatus 10 transmits the data by using the network setting in which this Temp IP is set as the transmission source address, it is spuriously recognized that the image forming apparatus 10 belongs to the subnetwork which the PC terminal 40 belongs to. Therefore, even though the PC terminal 40 accepts only the access from the device having the transmission source address assigned in the subnetwork which the PC terminal 40 belongs to, the image forming apparatus 10 can certainly access to the PC terminal 40.

In FIG. 3, the Temp IP which is the transmission source address is directly obtained from the access information 100. However, the address of the lending server 120 which temporarily lends the transmission source address may be included in the access information 100, and the image forming apparatus 10 may obtain the transmission source address from the lending server 120 by using the address of the lending server 120.

Next, the method for limiting the access to the PC terminal 40 will be explained. In one or more embodiments of the present invention, the PC terminal 40 limits the access to the PC terminal 40 by the following method.

(Method 1: Authentication Carried Out by Using the Key Information)

Firstly, the PC terminal 40 writes the key information corresponding to the key information of the PC terminal 40 and the access information in the IC card 90.

Next, when the image forming apparatus 10 reads the access information from the IC card 90, the image forming apparatus 10 also reads the above-described key information. When the image forming apparatus 10 accesses to the PC terminal 40 by using the network setting which is set in accordance with the access information, the image forming apparatus 10 transmits the key information which is read from the IC card 90.

The PC terminal 40 determines whether the image forming apparatus 10 has the access right for accessing to the PC terminal 40, by comparing the key information received from the image forming apparatus 10 with the key information which the PC terminal 40 has. Then, the PC terminal 40 transmits the result of the above determination to the image forming apparatus 10.

The image forming apparatus 10 allows the operation for transmitting the data to the PC terminal 40 by using the network setting based on the access information obtained from the IC card 90, only when the image forming apparatus 10 receives the result indicating that the image forming apparatus 10 has the access right. Specifically, when the candidates of the transmission destination of the data are displayed on the display unit 31, the PC terminal 40 is displayed as one candidate of the transmission destination only in case that the image forming apparatus 10 receives the result indicating that the image forming apparatus 10 has the access right.

Therefore, in case that the user logs in the image forming apparatus 10 by using the IC card 90 in which the access information is written by a device other than the PC terminal 40, the transmission of the data to the PC terminal 40 is prohibited. As a result, the security can be maintained at a certain level or more.

The key information which the PC terminal 40 has may be unique information. In one or more embodiments of the present invention, when the access information is written in the IC card 90, the PC terminal 40 prepares a pair of the predetermined keys and writes one of the keys in the IC card 90.

Figure 4:
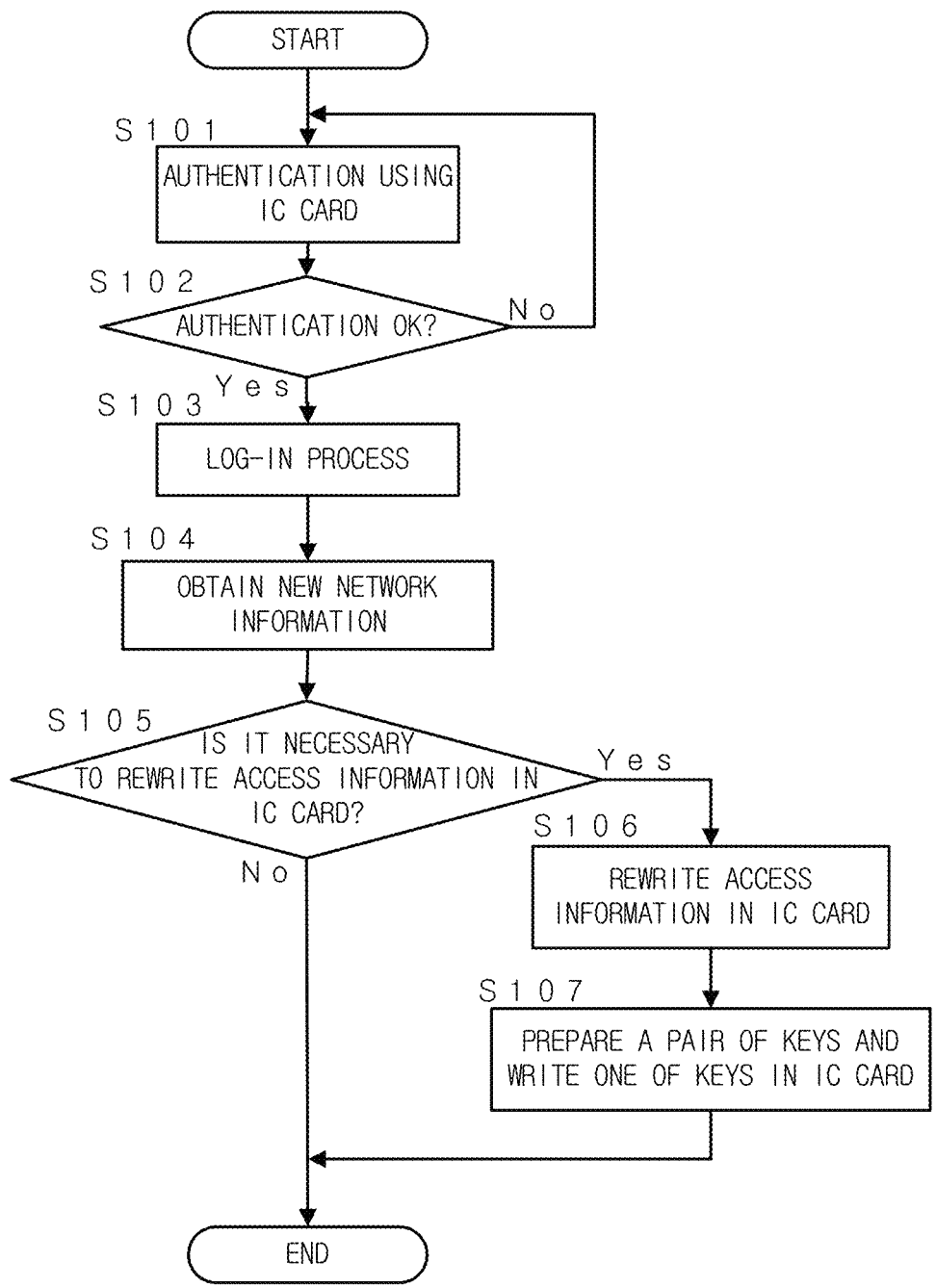
FIG. 4 is a flowchart showing the process which is carried out by the PC terminal when the access information is written according to one or more embodiments of the present invention.

Next, the process which is carried out by each device in the access information setting system 7 is shown. FIG. 4 shows the process which is carried out by the PC terminal 40 when the access information is written in the IC card 90.

Firstly, when the IC card 90 is mounted on the card access device 50, the PC terminal 40 carries out the user authentication by reading the user information and the like from the IC card 90 (Step S101). In case that the user authentication is not successful (Step S102; No), the process is continued by returning to Step S101. In case that the user authentication is successful (Step S102; Yes), the PC terminal 40 carries out the log-in process (Step S103).

Next, the PC terminal 40 obtains the current network information (Step S104), and updates the access information to be written in the IC card 90, to the current access information. For example, in case that the subnetwork which the PC terminal 40 belongs to is changed due to the movement of the PC terminal 40 or the like, the access information is updated to the access information which is compliant with the subnetwork which the PC terminal 40 currently belongs to.

Next, the PC terminal 40 determines whether it is necessary to overwrite the access information in the IC card 90 (Step S105). Specifically, in case that no access information is written in the IC card 90 or in case that the access information is written in the IC card 90 but the written access information is different from the current access information obtained by updating the access information in Step S104, it is determined that it is necessary to overwrite the access information in the IC card 90 (Step S105; Yes). The PC terminal 40 overwrites (rewrites) the current access information in the IC card 90 (Step S106), and prepares a pair of the predetermined keys to write one of the keys in the IC card 90 (Step S107). Then, the process is ended.

In case that the access information is written in the IC card 90 and the written access information has the same contents as the current access information obtained by updating the access information in Step S104, it is determined that it is not necessary to overwrite the access information in the IC card 90 (Step S105; No). Then, the process is ended. In the flowchart shown in FIG. 4, in case that it is determined that it is not necessary to overwrite the access information, the key information is not updated. However, the key information may be updated.

Figure 5:
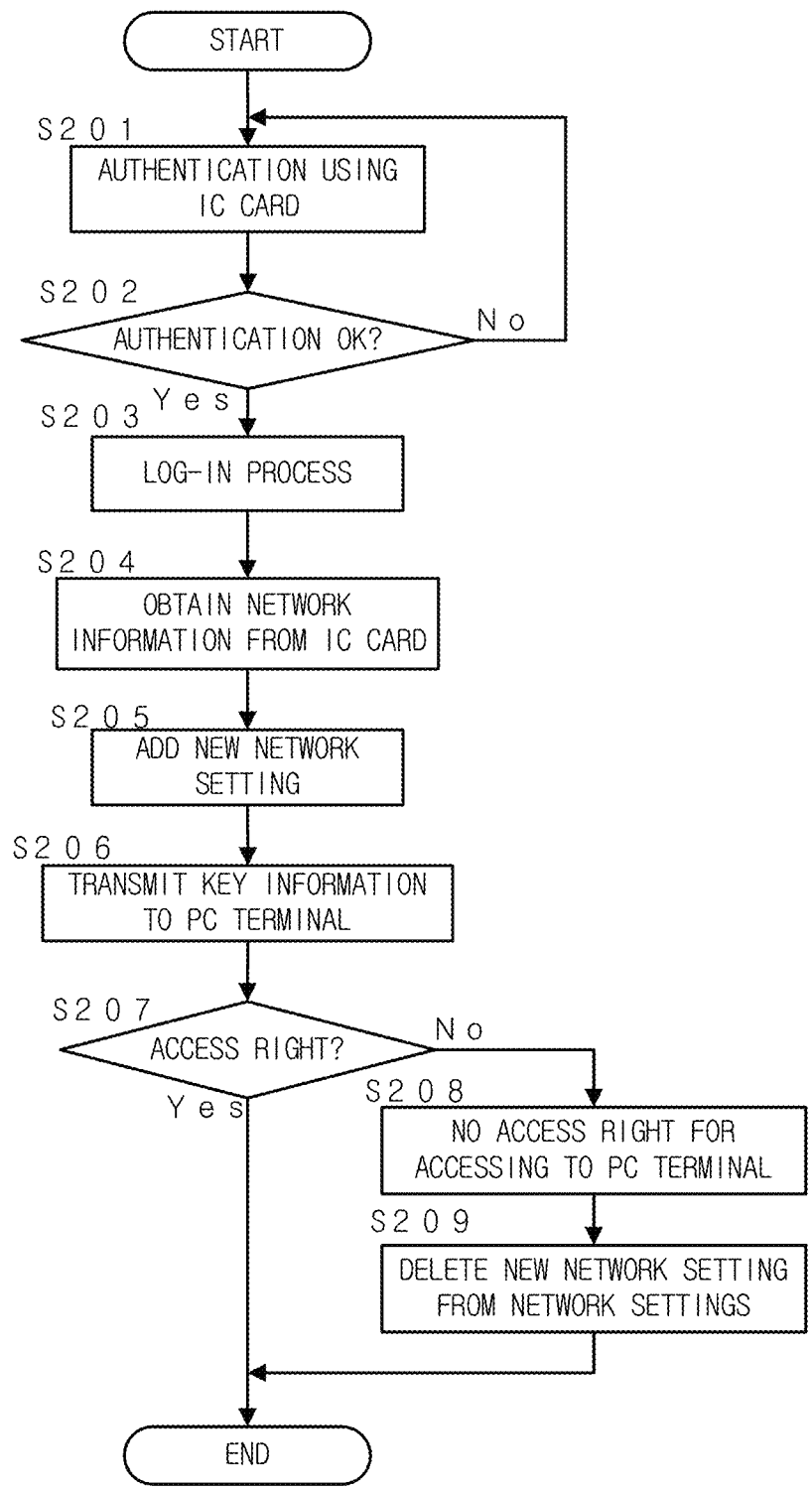
FIG. 5 is a flowchart showing the process which is carried out by the image forming apparatus when the access information is obtained according to one or more embodiments of the present invention.

FIG. 5 shows the process in which the image forming apparatus 10 sets the network setting for enabling the image forming apparatus 10 to access to the PC terminal 40. Firstly, when the IC card 90 contacts with the information reading unit 24, the image forming apparatus 10 carries out the user authentication by reading the user information and the like from the IC card 90 (Step S201).

In case that the user authentication is not successful (Step S202; No), the process is continued by returning to Step S201. In case that the user authentication is successful (Step S202; Yes), the PC terminal 40 carries out the log-in process (Step S203). Further, the image forming apparatus 10 obtains the access information, the key information and the like from the IC card 90 (Step S204).

Next, the image forming apparatus 10 sets the network setting in accordance with the access information obtained in Step S204. At this time, the image forming apparatus 10 additionally sets the new network setting in addition to the network setting which has been already set in the image forming apparatus 10 (Step S205). Because the image forming apparatus 10 does not overwrite the new network setting, but additionally sets the new network setting, it is possible to select the network setting to be used between the network setting which has been already set and the network setting which is additionally set.

Next, the image forming apparatus 10 transmits the key information obtained in Step S204 to the PC terminal 40 by using the network setting which is additionally set in Step S205, and inquires of the PC terminal 40 whether the image forming apparatus 10 has the access right or not (Step S206).

In case that the image forming apparatus 10 receives the response indicating that the image forming apparatus 10 has the access right from the PC terminal 40 (Step S207; Yes), the image forming apparatus 10 allows the operation for transmitting the data to the PC terminal 40 by using the network setting which is additionally set in Step S205. Then, the process is ended. In case that the operation for transmitting the data to the PC terminal 40 by using the network setting which is additionally set in Step S205 is allowed, the PC terminal 40 is displayed as one candidate of the transmission destination, for example, when the image data obtained by the scan job is transmitted to an external device. When the PC terminal 40 is selected as the transmission destination, the image forming apparatus 10 transmits the data to the PC terminal 40 by using the network setting which is additionally set.

In case that the image forming apparatus 10 receives the response indicating that the image forming apparatus 10 does not have the access right from the PC terminal 40 or in case that the image forming apparatus 10 does not receive the response for the predetermined time or more (Step S207; No), it is determined that the image forming apparatus 10 does not have the access right for accessing to the PC terminal 40 (Step S208). The image forming apparatus 10 deletes the network setting which is additionally set in Step S205 (Step S209). Then, the process is ended.

In one or more embodiments of the present invention, immediately after the network setting is additionally set, it is checked whether the image forming apparatus 10 has the access right or not in accordance with the key information. However, it may be checked whether the image forming apparatus 10 has the access right or not in accordance with the key information immediately before the data is transmitted to the PC terminal 40.

Figure 6:
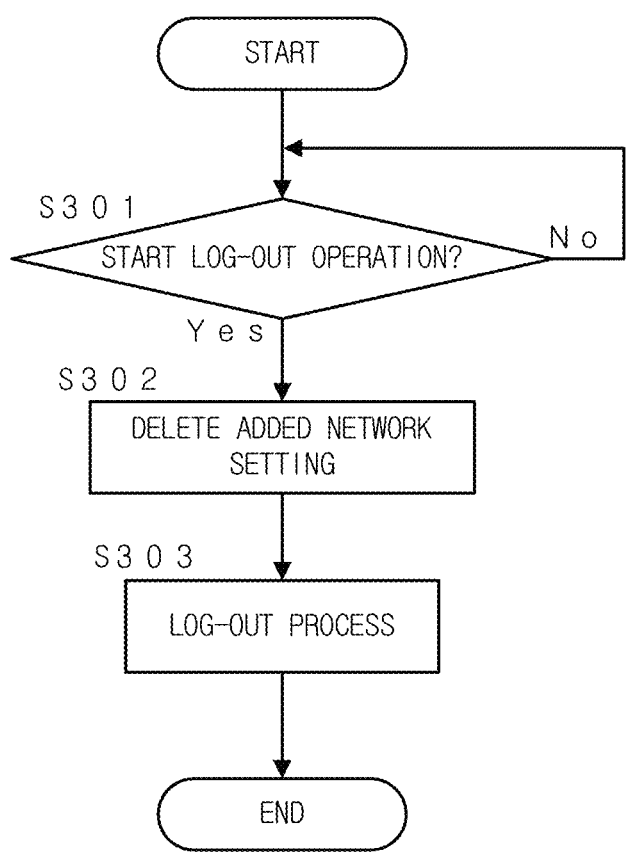
FIG. 6 is a flowchart showing the process which is carried out by the image forming apparatus in case that a user carries out the log-out operation according to one or more embodiments of the present invention.

The network setting which is additionally set in the image forming apparatus 10 in Step S205 is deleted when the user logs out. FIG. 6 shows the process in which the image forming apparatus 10 deletes the network setting at the log-out operation.

Firstly, in the situation in which the user logs in the image forming apparatus 10, the image forming apparatus 10 waits for the reception of the log-out operation (Step S301; No). When the image forming apparatus 10 receives the log-out operation (Step S301; Yes), the network setting which is additionally set in Step S205 shown in FIG. 5 is deleted if the network setting has not been deleted (Step S302). Then, the log-out process is carried out (Step S303), and the process is ended.

Next, the process in which the image forming apparatus 10 borrows the account and/or the transmission source address for accessing to the PC terminal 40 from the lending server 120 will be explained. In FIGS. 7 to 10, the case in which the transmission source address is borrowed will be explained as an example.

Figure 7:
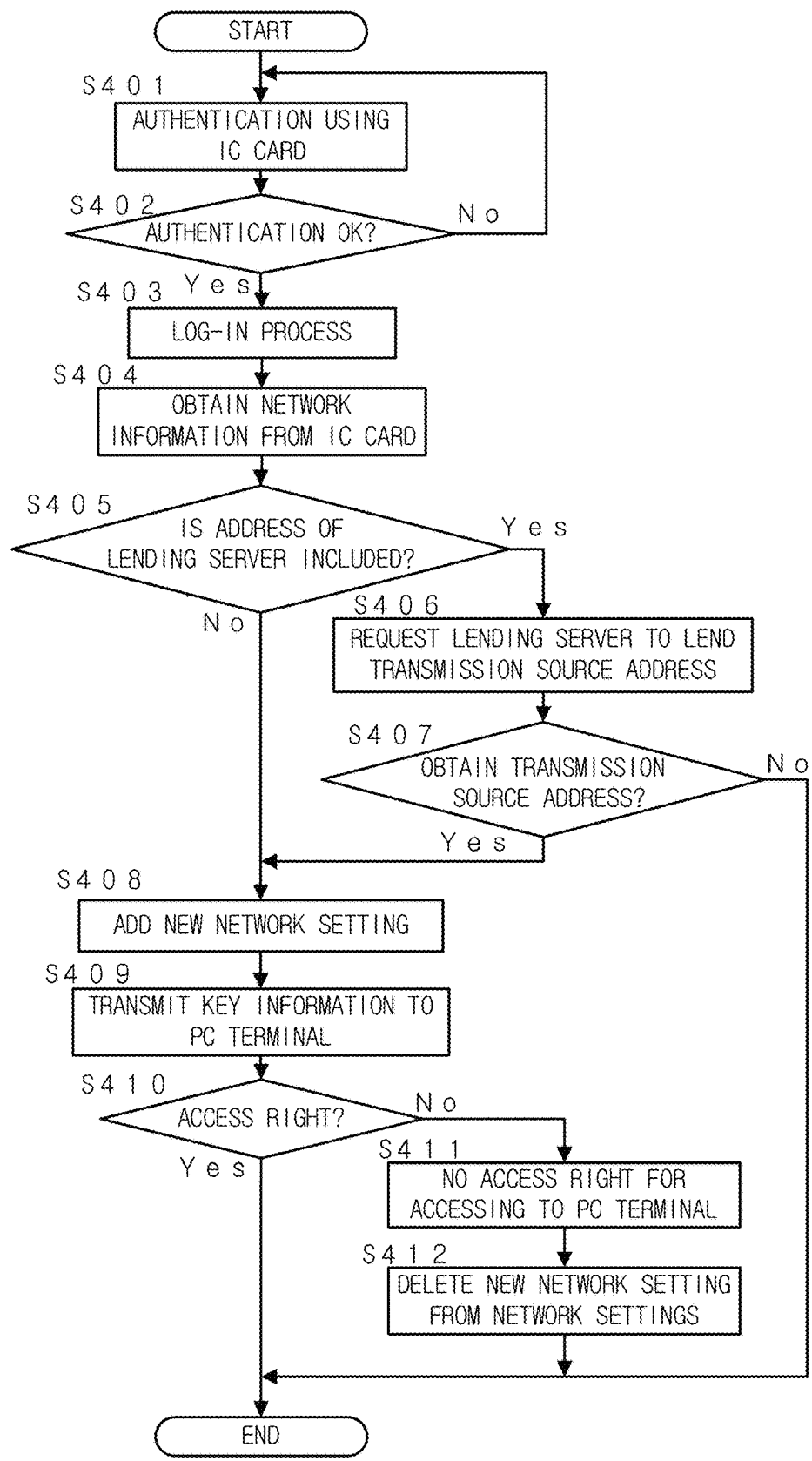
FIG. 7 is a flowchart showing the process which is carried out by the image forming apparatus in case that the transmission source address and/or the account is borrowed from the lending server according to one or more embodiments of the present invention.

FIG. 7 shows the process which is carried out by the image forming apparatus 10 in case that the transmission source address for accessing to the PC terminal 40 is borrowed from the lending server 120. Firstly, when the IC card 90 contacts with the information reading unit 24, the image forming apparatus 10 carries out the user authentication by reading the user information and the like from the IC card 90 (Step S401).

In case that the user authentication is not successful (Step S402; No), the process is continued by returning to Step S401. In case that the user authentication is successful (Step S402; Yes), the image forming apparatus 10 carries out the log-in process (Step S403). Further, the image forming apparatus 10 obtains the access information, the key information and the like from the IC card 90 (Step S404).

In case that the address of the lending server 120 is not included in the access information obtained in Step S404 (Step S405; No), the process proceeds to Step S408. In case that the address of the lending server 120 is included in the access information obtained in Step S404 (Step S405; Yes), the image forming apparatus 10 requests the lending server 120 to lend the transmission source address (the lent address) by using the address included in the access information (Step S406).

In case that the lent address cannot be obtained from the lending server 120 (Step S407; No), the process is ended. When the lent address is obtained from the lending server 120 (Step S407; Yes), the image forming apparatus 10 sets the network setting in accordance with both of the lent address and the access information obtained in Step S404. At this time, the image forming apparatus 10 additionally sets the new network setting in addition to the network setting which has been already set in the image forming apparatus 10 (Step S408).

In case that the process proceeds to Step S408 via Step S405; No, the image forming apparatus 10 sets the network setting in accordance with only the access information obtained in Step S404.

Next, the image forming apparatus 10 transmits the key information obtained in Step S404 to the PC terminal 40 by using the network setting which is additionally set in Step S408, and inquires of the PC terminal 40 whether the image forming apparatus 10 has the access right or not (Step S409).

In case that the image forming apparatus 10 receives the response indicating that the image forming apparatus 10 has the access right from the PC terminal 40 (Step S410; Yes), the image forming apparatus 10 allows the operation for transmitting the data to the PC terminal 40 by using the network setting which is additionally set in Step S408. Then, the process is ended.

In case that the image forming apparatus 10 receives the response indicating that the image forming apparatus 10 does not have the access right from the PC terminal 40 or in case that the image forming apparatus 10 does not receive the response for the predetermined time or more (Step S410; No), it is determined that the image forming apparatus 10 does not have the access right for accessing to the PC terminal 40 (Step S411). The image forming apparatus 10 deletes the network setting which is additionally set in Step S408 (Step S412). Then, the process is ended.

Figure 8:
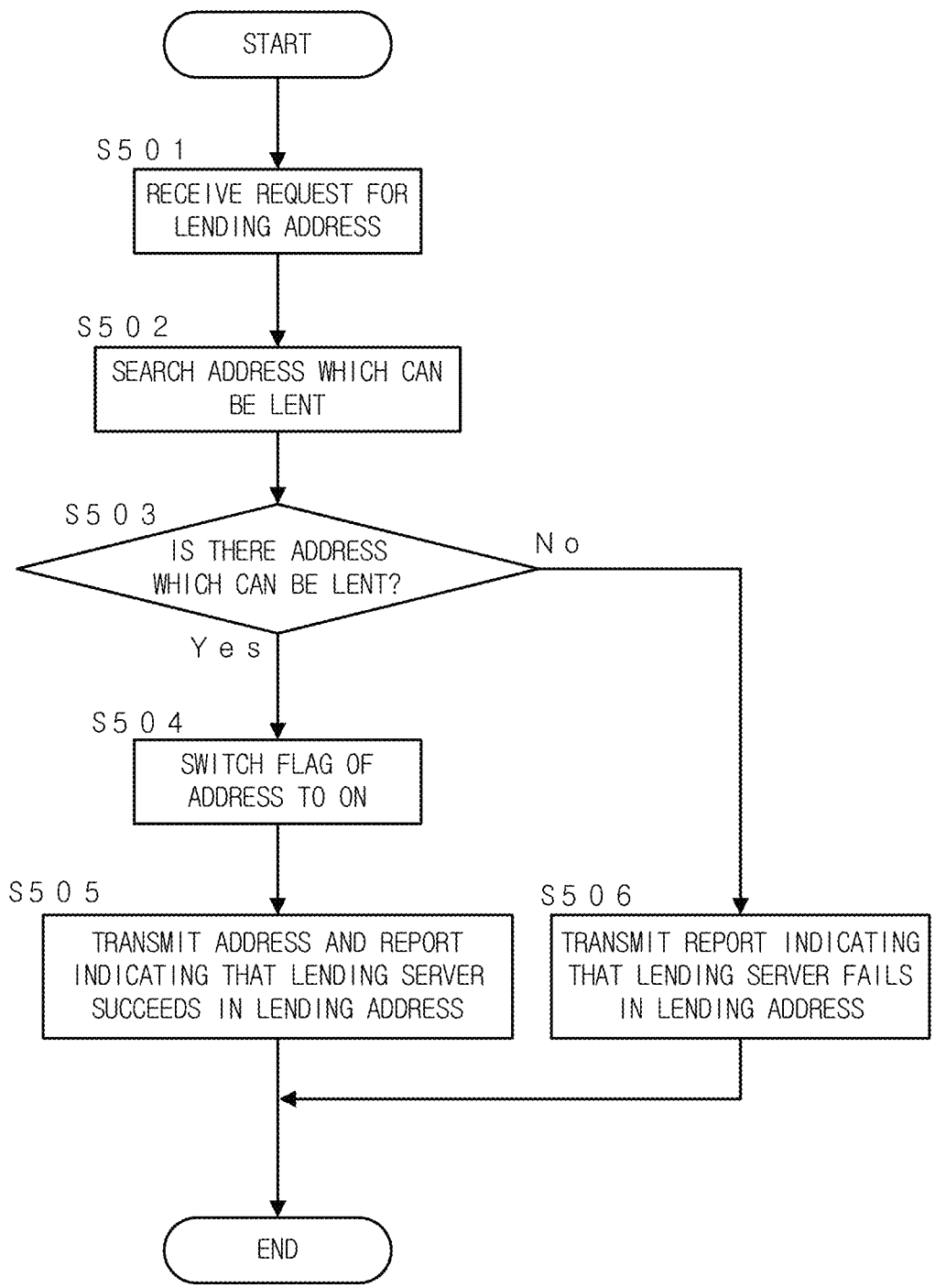
FIG. 8 is a flowchart showing the process which is carried out in case that the lending server lends the address according to one or more embodiments of the present invention.

Next, the process which is carried out by the lending server 120 will be explained. FIG. 8 shows the process in which the lending server 120 which receives the request of the lent address from the image forming apparatus 10 lends the lent address. Firstly, when the lending server 120 receives the request of the lent address from the image forming apparatus 10 (Step S501), the lending server 120 searches the address which can be lent as the lent address (Step S502).

The lending server 120 manages one or more lent addresses. In each lent address, the flag indicating whether the lent address is currently lent or not is included. The lending server 120 switches the flag of each address between "ON" and "OFF". The ON state of the flag indicates that the corresponding lent address is currently lent. The OFF state of the flag indicates that the corresponding lent address can be lent.

In case that the flag of each lent address is in the ON state, that is, in case that there is no address which can be lent (Step S503; No), the lending server 120 informs the image forming apparatus 10 that there is no address which can be lent (the lending server 120 fails in lending the lent address) (Step S506). Then, the process is ended.

In case that the flag of at least one lent address is in the OFF state, that is, in case that there is a lent address which can be lent (Step S503; Yes), the lending server 120 switches the flag of the lent address to "ON" (Step S504). Then, the lending server 120 transmits the lent address and the report indicating that the lending server 120 succeeds in lending the lent address, to the image forming apparatus 10 (Step S505), and the process is ended.

Figure 9:
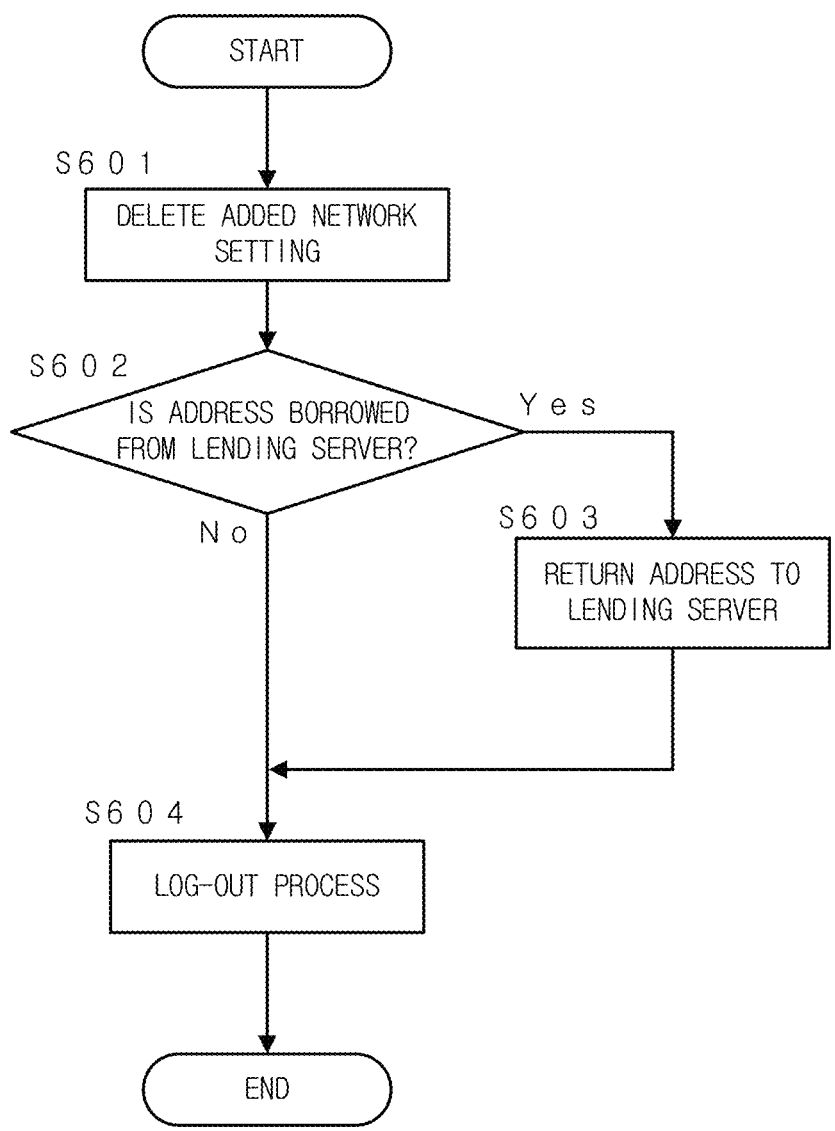
FIG. 9 is a flowchart showing the process which is carried out by the image forming apparatus which borrows the address from the lending server, in case that a user carries out the log-out operation, according to one or more embodiments of the present invention.

In case that the image forming apparatus 10 borrows the lent address, the image forming apparatus 10 returns the lent address to the lending server 120 at the log-out operation. In FIG. 9, the process which is carried out at the log-out operation by the image forming apparatus 10 which borrows the address from the lending server 120, will be explained.

Firstly, in the situation in which the user logs in the image forming apparatus 10, when the image forming apparatus 10 receives the log-out operation, the image forming apparatus 10 deletes the network setting which is additionally set in Step S408 shown in FIG. 7 (Step S601).

Then, in case that the address which is set in the network setting deleted in Step S601 is not an address obtained from the lending server 120 (Step S602; No), the process proceeds to Step S604.

In case that the address which is set in the network setting deleted in Step S601 is an address obtained from the lending server 120 (Step S602; Yes), the image forming apparatus 10 returns the address to the lending server 120 (Step S603) and carries out the log-out process (Step S604). Then, the process is ended.

The account and the transmission source address which are borrowed from the lending server 120 are temporarily borrowed. For example, when the network setting is deleted due to the log-out operation, the account and the transmission source address cannot be used.

Figure 10:
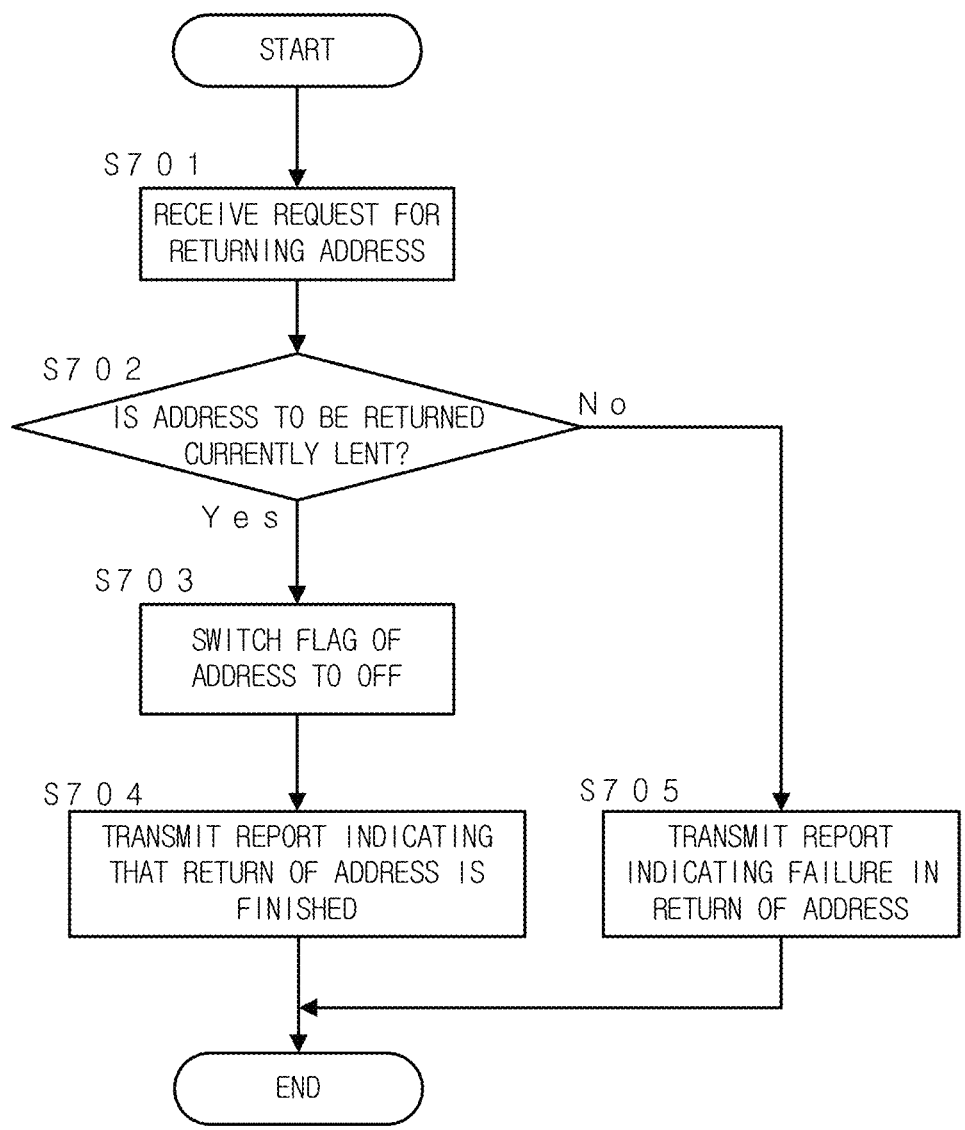
FIG. 10 is a flowchart showing the process which is carried out by the lending server in case that the address is returned according to one or more embodiments of the present invention.

FIG. 10 shows the process which is carried out by the lending server 120 in case that the lent address is returned. Firstly, the lending server 120 receives the request for returning the address from the image forming apparatus 10 (Step S701). Next, the lending server 120 checks whether the flag of the address to be returned is in the ON state (the address is currently lent) (Step S702).

In case that the flag is in the ON state (the address is currently lent) (Step S702; Yes), the lending server 120 switches the state of the flag to OFF (Step S703) and transmits the response indicating that the return of the address is finished, to the image forming apparatus 10 (Step S704). Then, the process is ended.

In case that the flag is in the OFF state (Step S702; No), the lending server 120 determines that the address has been already returned, and transmits the response indicating the failure in the return of the address, to the image forming apparatus 10 (Step S705). Then, the process is ended.

The above embodiments are explained by using the drawings. However, concrete configurations of the invention are not limited to the above embodiments. In the present invention, various modifications of the above embodiments or the addition of various functions or the like to the above embodiments can be carried out without departing from the gist of the invention.

In one or more embodiments of the present invention, the PC terminal 40 and the card access device 50 having the function as the writing device are incorporated as one device. However, each of the PC terminal 40 and the card access device 50 may be configured as an independent device. Further, the card access device 50 may be connected with another device. For example, in case that the card access device 50 is not connected with the PC terminal 40, but is connected with the management server, the management server monitors the network configuration and the like, updates the contents to be written as the access information to the new contents and writes the access information having the new contents in the IC card 90.

In one or more embodiments of the present invention, the IC card 90 which is used for the log-in operation for logging in the image forming apparatus 10 and the PC terminal 40, has the function as the storing medium. However, the storing medium may be another medium. The data may be written in the storing medium and read from the storing medium other than when the log-in operation is successful.

In one or more embodiments of the present invention, when the log-in operation is successful, the access information is automatically written and read. However, a user can select whether the access information is written in the IC card 90 and select whether the access information is read from the IC card 90. Therefore, in case that the user uses the PC terminal 40 and the image forming apparatus 10 in order, but the user does not plan to transmit the data from the image forming apparatus 10 to the PC terminal 40, for example, in case that the user plans to transmit the data to the device other than the PC terminal 40, the access information is not written nor read unnecessarily.

Even though the access information is read in the image forming apparatus 10, the user may select whether the network setting is set in accordance with the read access information or not.

In one or more embodiments of the present invention, the time period which elapses since the access information is written in the IC card 90 by the PC terminal 40 until the user logs in the image forming apparatus 10, is not limited. However, only in case that the user logs in the image forming apparatus 10 within the predetermined time period since the access information is written in the IC card 90 by the PC terminal 40, the network setting which is set in accordance with the written access information may be valid.

In one or more embodiments of the present invention, the image forming apparatus 10 additionally sets the network setting for accessing to the PC terminal 40 in accordance with the access information obtained from the IC card 90 in addition to the network setting which has been already set in the image forming apparatus 10. However, the image forming apparatus 10 does not additionally sets the network setting, but may overwrite the new network setting on the network setting which has been already set.

In one or more embodiments of the present invention, the writing device writes the access information for accessing to the data reception device via the network in the storing medium. Then, the data transmission device obtains the access information from the storing medium, and sets the network setting for accessing to the data reception device in accordance with the access information as one network setting which can be used by the data transmission device. Therefore, if only a user who has the storing medium moves between the data reception device and the data transmission device, the data transmission device can access to the data reception device.

In one or more embodiments of the present invention, the data transmission device accepts the authentication for accessing to the data reception device by using the authentication method and the account information included in the access information, and transmits the data to the data reception device. For example, the authentication may be carried out by the data reception device, or the authentication carried out by the authentication device may be accepted. Further, the above authentication is carried out in case that the authentication is required for the access to the data reception device. Therefore, in case that the authentication is not required for the access to the data reception device, the data transmission device may access to the data reception device without accepting the authentication.

In one or more embodiments of the present invention, the data transmission device temporarily borrows the account for enabling the data transmission device to access to the data reception device by using the address of the lending server, which is included in the access information. Then, the data transmission device accepts the authentication for accessing to the data reception device by using the authentication method included in the access information and the borrowed account, and transmits the data to the data reception device. For example, the authentication may be carried out by the data reception device, or the authentication carried out by the authentication device may be accepted. Further, the above authentication is carried out in case that the authentication is required for the access to the data reception device. Therefore, in case that the authentication is not required for the access to the data reception device, the data transmission device may access to the data reception device without accepting the authentication.

In one or more embodiments of the present invention, the storing medium in which the access information is written is included in the authentication medium which is used in case that the user authentication is carried out in the data transmission device. Then, in case that the user authentication is successful in the data transmission device and the user logs in the data transmission device, the data transmission device obtains the access information from the authentication medium. Because the access information is also read by only the operation for carrying out the log-in process, the burden of the user can be reduced.

In one or more embodiments of the present invention, the network setting is additionally set in accordance with the access information in addition to the network setting which has been already set in the data transmission device. Because the network setting which has been already set is not deleted and is maintained, it is possible to switch the network setting according to the transmission destination.

In one or more embodiments of the present invention, the transmission source address for accessing to the data reception device is included in the network setting. For example, by setting the address which is assigned in the subnetwork which the data reception device belongs to, as the transmission source address, the data transmission device can access to the data reception device even though the data reception device receives only the data transmitted from the data transmission device having the address which is assigned in the subnetwork which the data reception device belongs to, as the transmission source address.

In one or more embodiments of the present invention, the first key information corresponding to the second key information of the data reception device is written in the storing medium, and the data transmission device obtains the first key information and transmits the first key information to the data reception device. The data reception device determines whether the data transmission device has the access right by comparing the first key information which is received from the data transmission device with the second key information which the data reception device has, and transmits the result of the determination to the data transmission device. Then, the data transmission device allows the operation for transmitting the data to the data reception device by using the network setting which is set in accordance with the access information obtained from the storing medium, only in case that the data transmission device receives the result indicating that the data transmission device has the access right. Therefore, even though the data transmission device obtains the access information from the storing medium in which the access information is written by a device other than the writing device, the transmission of the data to the data reception device is prohibited. As a result, the security can be maintained at a certain level or more.

In one or more embodiments of the present invention, the storing medium in which the access information is written is included in the authentication medium which is used in case that the user authentication is carried out in the data reception device. Then, in case that the user authentication is successful in the data reception device and the user logs in the data reception device, the data reception device writes the access information in the storing medium included in the authentication medium. Because the access information is also read by only the operation for carrying out the log-in process, the burden of the user can be reduced.

According to the access information setting system, the access information setting method and the data transmission device of one or more embodiments of the present invention, it is possible to simply and certainly set the network setting for accessing to the data reception device, in the data transmission device, even though the IP address of the data reception device is changed, the network configuration of the network which the data reception device belongs to is changed, or the account for enabling the data transmission device to access to the data reception device is changed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An access information setting system, comprising:
    a data reception device;
    a data transmission device; and
    a writing device that
        is included in or connected to the data reception device, and
        writes, in a storing medium, access information for accessing to the data reception device via a network, where a network setting is determined based on the access information,
    wherein the data transmission device
        obtains the access information from the storing medium,
        establishes a first connection to the network based on the network setting, and
        transmits data to the data reception device via the first connection.

2. The access information setting system of claim 1, wherein
    the access information includes an authentication method and account information for accessing to the data reception device, and
    the data transmission device is authenticated to access to the data reception device by using the authentication method and the account information, and then transmits the data to the data reception device.

3. The access information setting system of claim 1, wherein
    the access information includes an authentication method for accessing to the data reception device and an address of a lending server that temporarily lends an account for authorizing the data transmission device to access to the data reception device, and
    the data transmission device is authenticated to access to the data reception device by using the authentication method and the account lent from the lending server, and then transmits the data to the data reception device.

4. The access information setting system of claim 1, wherein
    the data transmission device comprises an authenticator that carries out a user authentication,
    the storing medium is included in an authentication medium used for the user authentication, and
    the data transmission device obtains the access information from the storing medium when the data transmission device succeeds in the user authentication using the authentication medium.

5. The access information setting system of claim 1, wherein the data transmission device additionally establishes a second connection to the network based on the network setting in addition to the first connection.

6. The access information setting system of claim 1, wherein the network setting includes a transmission source address.

7. The access information setting system of claim 6, wherein
    the transmission source address is included in the access information; or
    the access information includes an address of a lending server that temporarily lends the transmission source address, and the data transmission device obtains the transmission source address from the lending server.

8. The access information setting system of claim 1, wherein
    the writing device writes, in the storing medium, the access information and first key information corresponding to second key information that the data reception device has,
    the data transmission device transmits the first key information read from the storing medium, to the data reception device,
    the data reception device determines whether the data transmission device has an access right for accessing to the data reception device, by comparing the first key information received from the data transmission device with the second key information that the data reception device has, and transmits a result of determining whether the data transmission device has the access right, to the data transmission device, and
    the data transmission device transmits the data to the data reception device through the first connection established based on the access information obtained from the storing medium, only in case that the data transmission device receives the result indicating that the data transmission device has the access right.

9. The access information setting system of claim 1, wherein
    the data reception device comprises an authenticator that carries out a user authentication,
    the storing medium is included in an authentication medium used for the user authentication, and
    the data reception device writes the access information in the storing medium when the data reception device succeeds in the user authentication using the authentication medium.

10. The access information setting system of claim 1, wherein
    the data transmission device is connected to the network through a third connection via a router,
    the data reception device is connected to the network through a fourth connection via another router, and
    the data transmission device and the data reception device belong to different subnetworks from each other.

11. An access information setting method using an access information setting system that comprises a data reception device, a data transmission device, and a writing device included in or connected to the data reception device, the method comprising:
    writing access information for accessing to the data reception device via a network, in a storing medium by the writing device, where a network setting is determined based on the access information;

obtaining the access information from the storing medium, by the data transmission device;

establishing a first connection to the network based on the network setting by the data transmission device; and transmitting data to the data reception device by the data transmission device via the first connection.

12. The access information setting method of claim 11, wherein the access information includes an authentication method for accessing to the data reception device and account information for authorizing the data transmission device to access to the data reception device, and the data transmission device is authenticated to access to the data reception device by using the authentication method and the account information, and then transmits the data to the data reception device.

13. The access information setting method of claim 11, wherein the access information includes an authentication method for accessing to the data reception device and an address of a lending server that temporarily lends an account for authorizing the data transmission device to access to the data reception device, and the data transmission device is authenticated to access to the data reception device by using the authentication method and the account lent from the lending server, and then transmits the data to the data reception device.

14. The access information setting method of claim 11, further comprising:

carrying out a user authentication by the data transmission device, wherein the storing medium is included in an authentication medium used for the user authentication, and the data transmission device obtains the access information from the storing medium when the data transmission device succeeds in the user authentication using the authentication medium.

15. The access information setting method of claim 11, wherein the data transmission device additionally establishes a second connection to the network based on the network setting in addition to the first connection network.

16. The access information setting method of claim 11, wherein the network setting includes a transmission source address.

17. The access information setting method of claim 16, wherein the transmission source address is included in the access information; or the access information includes an address of a lending server that temporarily lends the transmission source address, and the data transmission device obtains the transmission source address from the lending server.

18. A data transmission device, comprising:

a hardware processor that:

obtains access information from a storing medium where the access information for accessing to a data reception device via a network is written by a writing device included in or connected to the data reception device, and a network setting is determined based on the access information, and establishes a first connection to the network based on the network setting; and a transmitter that transmits data to the data reception device via the first connection.

* * * * *